United States Patent
Lai et al.

(10) Patent No.: US 12,443,043 B2
(45) Date of Patent: Oct. 14, 2025

(54) SYSTEM AND METHOD FOR MULTI-INSTANCES EMISSION FOR RETINA SCANNING BASED NEAR EYE DISPLAY

(71) Applicant: HES IP HOLDINGS, LLC, Austin, TX (US)

(72) Inventors: Jiunn-Yiing Lai, New Taipei (TW); Feng-Chun Yeh, Taipei (TW)

(73) Assignee: Oomii Inc., Grand Cayman (KY)

( * ) Notice: Subject to any disclaimer, the term of this patent is extended or adjusted under 35 U.S.C. 154(b) by 0 days.

(21) Appl. No.: 18/471,438

(22) Filed: Sep. 21, 2023

(65) Prior Publication Data
US 2024/0118550 A1    Apr. 11, 2024

Related U.S. Application Data

(60) Provisional application No. 63/414,085, filed on Oct. 7, 2022.

(51) Int. Cl.
*G02B 27/01* (2006.01)

(52) U.S. Cl.
CPC ..... *G02B 27/0172* (2013.01); *G02B 27/0179* (2013.01); *G02B 2027/0134* (2013.01); *G02B 2027/0187* (2013.01)

(58) Field of Classification Search
None
See application file for complete search history.

(56) References Cited

U.S. PATENT DOCUMENTS

| | | |
|---|---|---|
| 5,677,795 A | 10/1997 | Hegg |
| 8,248,458 B2 | 8/2012 | Schowengerdt et al. |
| 10,031,338 B2 | 7/2018 | Alexander et al. |

(Continued)

FOREIGN PATENT DOCUMENTS

| | | |
|---|---|---|
| CN | 101862178 A | 10/2010 |
| CN | 103119512 A | 5/2013 |

(Continued)

OTHER PUBLICATIONS

European Search Report, dated Mar. 6, 2024, in a counterpart or related EP patent application, No. EP 23201758.2.

(Continued)

*Primary Examiner* — Nitin Patel
*Assistant Examiner* — Sarvesh J Nadkarni
(74) *Attorney, Agent, or Firm* — Chen Yoshimura LLP

(57) ABSTRACT

A multi-instances emission system for retina scanning based near eye display is disclosed. The multi-instances emission system comprises: a right light emitter and a left light emitter for respectively emitting a right light signal and a left light signal to a first eye and a second eye of a viewer; at least one optical duplicator for respectively dividing the right light signal and the left light signal into multiple light instances; and at least one light signal redirector for changing direction of a plurality of light instances of the right light signal and a plurality of light instances of the left light signal, such that the plurality of light instances of the right light signal have optical paths that converge to form a first converging point and f the plurality of light instances of the left light signal have optical paths that converge to form a second converging point.

16 Claims, 13 Drawing Sheets

(56) References Cited

U.S. PATENT DOCUMENTS

| | | | |
|---|---|---|---|
| 10,234,699 | B2 | 3/2019 | Yoshida |
| 11,079,601 | B2 | 8/2021 | Greenberg |
| 11,256,092 | B2 | 2/2022 | Shamir et al. |
| 12,231,613 | B2 | 2/2025 | Lai et al. |
| 2008/0117289 | A1* | 5/2008 | Schowengerdt ..... G02B 26/005 348/E13.032 |
| 2014/0361957 | A1* | 12/2014 | Hua ................ G02B 27/0093 345/8 |
| 2015/0169070 | A1 | 6/2015 | Harp et al. |
| 2016/0178908 | A1 | 6/2016 | Dobschal et al. |
| 2016/0234482 | A1 | 8/2016 | Bickerstaff et al. |
| 2016/0238845 | A1* | 8/2016 | Alexander ......... G02B 27/0081 |
| 2017/0078651 | A1 | 3/2017 | Russell |
| 2017/0090202 | A1 | 3/2017 | Tatsuta |
| 2017/0168301 | A1* | 6/2017 | Chan ................ G02B 27/0172 |
| 2018/0081322 | A1 | 3/2018 | Robbins et al. |
| 2018/0164592 | A1* | 6/2018 | Lopes ............... G02B 27/0172 |
| 2018/0182174 | A1 | 6/2018 | Choi |
| 2018/0252926 | A1 | 9/2018 | Alexander et al. |
| 2018/0262758 | A1* | 9/2018 | El-Ghoroury ........ G02B 27/017 |
| 2018/0284441 | A1 | 10/2018 | Cobb |
| 2019/0064435 | A1 | 2/2019 | Karafin et al. |
| 2019/0172216 | A1 | 6/2019 | Ninan et al. |
| 2019/0187473 | A1 | 6/2019 | Tomizawa et al. |
| 2019/0285897 | A1 | 9/2019 | Topliss et al. |
| 2019/0293939 | A1 | 9/2019 | Sluka |
| 2019/0320165 | A1 | 10/2019 | French et al. |
| 2021/0055555 | A1* | 2/2021 | Chi .......................... G02B 1/11 |
| 2022/0311992 | A1 | 9/2022 | Lai et al. |

FOREIGN PATENT DOCUMENTS

| | | |
|---|---|---|
| CN | 104010561 A | 8/2014 |
| CN | 107438796 A | 12/2017 |
| CN | 108427498 A | 8/2018 |
| CN | 109073901 A | 12/2018 |
| CN | 109716244 A | 5/2019 |
| CN | 110168427 A | 8/2019 |
| JP | H08-166556 A | 6/1996 |
| JP | H08-262366 A | 10/1996 |
| JP | H09-105885 A | 4/1997 |
| JP | H11-142763 A | 5/1999 |
| JP | 2000-214408 A | 8/2000 |
| JP | 2008-509438 A | 3/2008 |
| JP | 2011-13688 A | 1/2011 |
| JP | 2013-211308 A | 10/2013 |
| JP | 2014-130204 A | 7/2014 |
| JP | 2016-180939 A | 10/2016 |
| JP | 2018-508036 A | 3/2018 |
| JP | 2018-132756 A | 8/2018 |
| JP | 2018-166165 A | 10/2018 |
| JP | 2018-533062 A | 11/2018 |
| JP | 2023-500177 A | 1/2023 |
| KR | 20120069133 A | 6/2012 |
| TW | 201716827 A | 5/2017 |
| TW | 201809214 A | 3/2018 |
| WO | 2015/079610 A1 | 6/2015 |
| WO | 2016105281 A | 6/2016 |
| WO | 2021092314 A1 | 5/2021 |

OTHER PUBLICATIONS

Taiwanese Office Action, dated Nov. 27, 2023, in a counterpart or related Taiwanese patent application, No. TW 112112456.
PCT/US2020/059317 ISR and Written Opinion issued on Feb. 5, 2021.
Taiwanese Office Action, dated Aug. 23, 2022, in a counterpart or related Taiwanese patent application, No. TW 109141615.
EP 20886006.4 European Search Report issued on Nov. 21, 2023.

\* cited by examiner

| Virtual binocular Pixel | pair of designated location | Spatial coordinate (horizontal, vertical, depth) |
|---|---|---|
| BP1 | R(1,1), L(1,1) | h1, v1, d1 |
| BP2 | R(1,1), L(1,2) | h2, v2, d2 |
| ... | ... | ... |
| BP6 | R(1,1), L(1,6) | h6, v6, d6 |
| BP7 | R(2,1), L(2,1) | h7, v7, d7 |
| ... | ... | ... |
| BP216 | R(6,6), L(6,6) | h216, v216, d216 |

FIG. 7

SYSTEM AND METHOD FOR MULTI-INSTANCES EMISSION FOR RETINA SCANNING BASED NEAR EYE DISPLAY

BACKGROUND OF THE INVENTION

Field of the Invention

The present invention relates to a retina scanning based augmented reality device capable of displaying virtual images for a viewer to perceive said virtual images being at specific three-dimensional (3D) coordinates in real space; more particularly, the present invention relates to a retina scanning based augmented reality device having expanded effective viewing area (eyebox) and the method for expanding effective viewing area in retina scanning based augmented reality devices.

Description of Related Art

One of the key challenges in designing head wearable AR/VR devices is to minimize the physical size of the devices while maintaining sufficient image rendered quality and expanding view angle for the viewer. One way to expand view angle is to create multiple view positions for the eyes at which the eyes are able to receive image information from the AR/VR device. The range of view position over which the images provided by the device is visible to the viewer may be referred to as the "eyebox." The size and geometry of the eyebox can greatly affect the viewer's experience. For example, if the eyebox is too small, the viewer may not be able to see the image produced by the head wearable AR/VR device when the sightline (or visual axis) of the viewer deviates from the direction of the incoming image by a relatively small amount. The expansion of eyebox (in other words, increasing the range or number of view positions of the images provided by a head wearable AR/VR device) is often achieved via optical means. However, expanding eyebox often involves providing additional bulky optical components to the head wearable AR/VR device. Therefore, it is desirable to design a system and a method for expanding eyebox without sacrificing the viewer experience and affecting the physical size of the head wearable AR/VR device.

With reference to FIG. 1, many novel near eye displays which are capable of creating multiple view positions (or view-points) for the viewer have been proposed. The idea is to create multiple instances from a single pixel and project the instances of said pixel to several locations (view-points, vp1, vp2, vp3). When all the pixels of an image frame are projected, the view-points become the locations where the viewer is able to receive the visual information of the plurality of pixels, and thereby, to see a full image rendered by the near eye display. Therefore, when the viewer's eyes rotate, the full image can still be perceived by the viewer. However, this method requires the near eye display to rendered multiple full images that are in proximity to each other just in front the entrance of the pupil. With reference to FIG. 1, often time, a view-point may undesirably overlap with the adjacent view-point, causing the viewer to see double images when the eyesight of the viewer receives image information of two view-points of the image frame.

SUMMARY

The key objects of the present invention are to increase the eyebox in retina scanning-based AR/MR near eye display system, as well as to resolve the issue of image overlapping in the prior multi-viewpoints near eye display systems.

The method for increasing eyebox in retina scanning-based AR/MR near eye display system comprising: emitting a right light signal and a left light signal to a first eye and a second eye of a viewer; dividing the right light signal and the left light signal into multiple light instances; modulating direction of a plurality of light instances of the right light signal and a plurality of light instances of the left light signal, such that the plurality of light instances of the right light signal has optical paths that converge to form a first converging point, and the plurality of light instances of the left light signal has optical paths that converge to form a second converging point; wherein the first converging point and the second converging point is located at the optical path after entering the pupil of the first eye and the second eye, wherein each of the plurality of light instances of the right light signal comprises a same image information, each of the plurality of light instances of the left light signal comprises a same image information.

In an embodiment of the present invention, an image frame or a binocular image containing a plurality of pixels is emitted to the retinae of the two eyes of the viewer. Each of the pixel emitted by the light emitter is divided into multiple instances. The present invention may comprise a right light emitter and a left light emitter for respectively emitting a right light signal and a left light signal. At least one optical duplicator is utilized for respectively dividing the right light signal and the left light signal into multiple light instances. At least one light signal redirector is provided for changing direction of a plurality of light instances of the right light signal and a plurality of light instances of the left light signal, such that the plurality of light instances of the right light signal have optical paths that converge with each other to form a first converging point; meanwhile, the plurality of light instances of the left light signal have optical paths that converge with each other to form a second converging point.

In some embodiments of the present invention, the first converging point and the second converging point are located sustainably on retina of the first eye and the second eye. In some alternative embodiments of the present invention, it is also possible that the first converging point and the second converging point are located sustainably on a side of the retina of the first eye and the second eye. Nonetheless, the first converging point and the second converging point are located at the optical path after entering the pupil of the first eye and the second eye.

In another embodiment of the present invention, the partial binocular image is composed of the fusion a left pixel on the left retina and a right pixel on the right retina. Furthermore, the left pixel is divided into a plurality of left light instances; similarly, the right pixel is divided into a plurality of right light instances. The plurality of left light instances and the plurality of right light instances are respectively emitted to the left retina and right retina of the viewer. Each of the first, second, and third left light instances are emitted to the same designated location of the left retina, forming a left converging point; each of the first, second, and third right light instances are emitted to the same designated location on the right retina, forming a right converging point. Since the right pixel and left pixel of the partial binocular image are composed of multiple light instances from different incident angles, the retina can receive the light instances regardless the orientation of the eye; therefore, the viewer can see the partial binocular image with wider eye-box, which means the effective field of view is expanded. The effective view angle of the partial binocular image is also expanded.

In some embodiments, the variation of the depth with respect to time of the partial binocular image formed by the right light signal and the left light signal when the viewer perceives the right light signal and the left light signal is modulated by changing the distance between the first converging point and the second converging point based on an interpupillary distance of the viewer.

BRIEF DESCRIPTION OF THE DRAWINGS

FIG. 7 is a table illustrating the relationship between the partial binocular images located in 3D space and the pairs of designated locations of retinae which forms the partial binocular images.

DETAILED DESCRIPTION OF PREFERRED EMBODIMENTS

Figure 1:
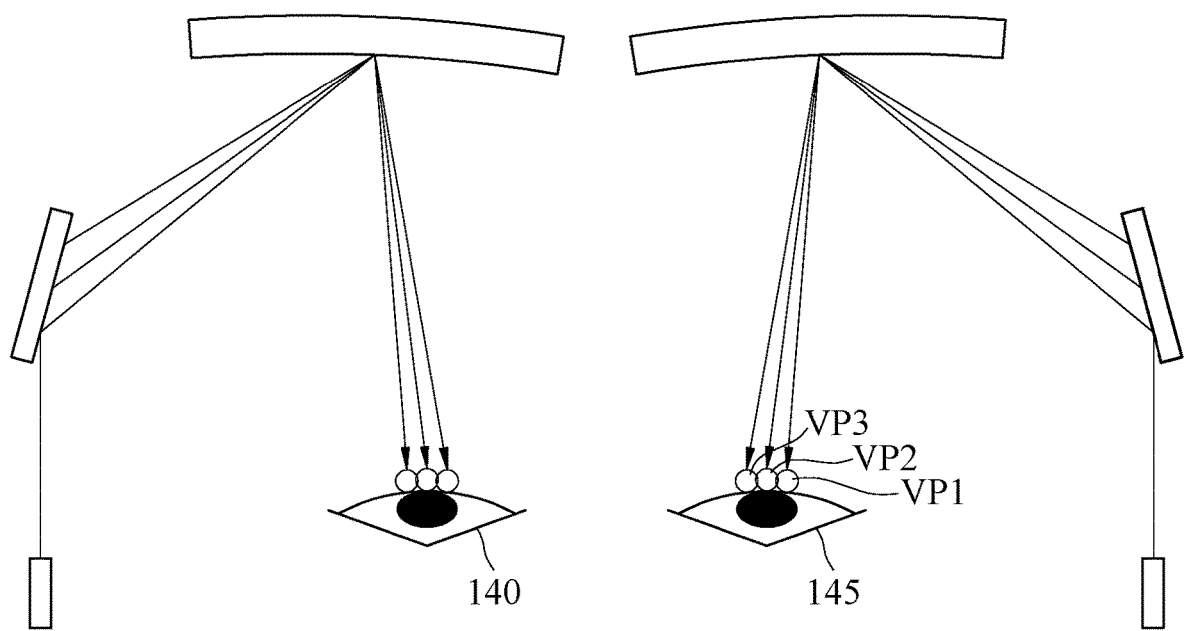
FIG. 1 illustrates the prior art of the present invention.

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be specifically defined as such in this Detailed Description section.

Retina scanning-based AR/MR near eye display system can directly emit light signal to the retina, and thereby, rendering resolved and clear virtual image on the retina, so the viewer can perceive the image of a virtual object without fixating and focusing at a display apparatus (e.g., a display panel). In some cases, the viewer can even perceive a clear image via the retina scanning-based AR/MR near eye display system without the aid of the focusing effect of the lens of the eye (focus-free).

An image frame emitted by the retina scanning-based AR/MR near eye display system is composed of a plurality of pixels; generally speaking, each pixel may be formed by one light pulse (or signal) emitted by the emitter. Furthermore, each light pulse has a unique optical path from the emitter to the retina; and each light pulse has a corresponding incident angle relative to the surface of the retina. In the present invention, each light pulse having a unique optical path may be referred as a light instance. A single light pulse or light instance may be further divided into a plurality of instance with appropriate optical elements, which is readily known to people having ordinary skill in the art. In a conventional retina scanning displaying system, each pixel may be rendered by emitting a single light instance onto the surface of the retina. Sometimes, it is also possible to use multiple light instances to create a single pixel.

The present invention may comprise at least two emitters for respectively emitting a right light signal to the first retina and a left light signal to the second retina. When both the first retina and second retina receive light signals from the emitters at specific locations on the retinae, the viewer may fixate at the image, and fusion of vision occurs; thereby, the viewer sees the resulting partial binocular image. In the present invention, an image frame may be composed of a plurality of partial binocular images, and each of the partial binocular images is perceived by the viewer to have a specific 3-dimensional coordinates in the real space. For example, the 3-dimensional coordinates correspond to a specific horizontal coordinate, vertical coordinate, and a depth coordinate relative to the viewer.

The following describes the method for rendering virtual image with three-dimensional perception in accordance with the present invention. To create a full image frame, a plurality of right light signals and a plurality of left light signals are emitted to the first retina and the second retina respectively to render a plurality of partial binocular images of the virtual image. Each of the plurality of right light signals has a corresponding left light signal from the plurality of second lights signals. In some embodiments, a right light signal and its corresponding left light signal have substantially the same image information. In some other embodiments, they may have image slightly different image information (e.g., parallax image information). In the following, the right light signal is assumed to have substantially the same image information as its corresponding left light signal. The right light signal and the corresponding left light signal form a partial binocular image when received by the first retina and the second retina at specific locations on the first and second retina. It is readily known that the horizontal and vertical position of a partial binocular image in 3-dimensional space perceived by the viewer is related to the horizontal and vertical positions on the first retina and the second retina where the right light signal and the left light signal are respectively emitted and received. However, according to the present invention, it has been proven that the depth position of the partial binocular image perceived by the viewer is also correlated to the horizontal and vertical positions on the first retina and the second retina where the right light signal and the corresponding left light signal are respectively received. Further in some instances, the depth perception of the viewer is also correlated to the horizontal distance between the locations where the right light signal and the corresponding left light signal are respectively received.

Figure 2:
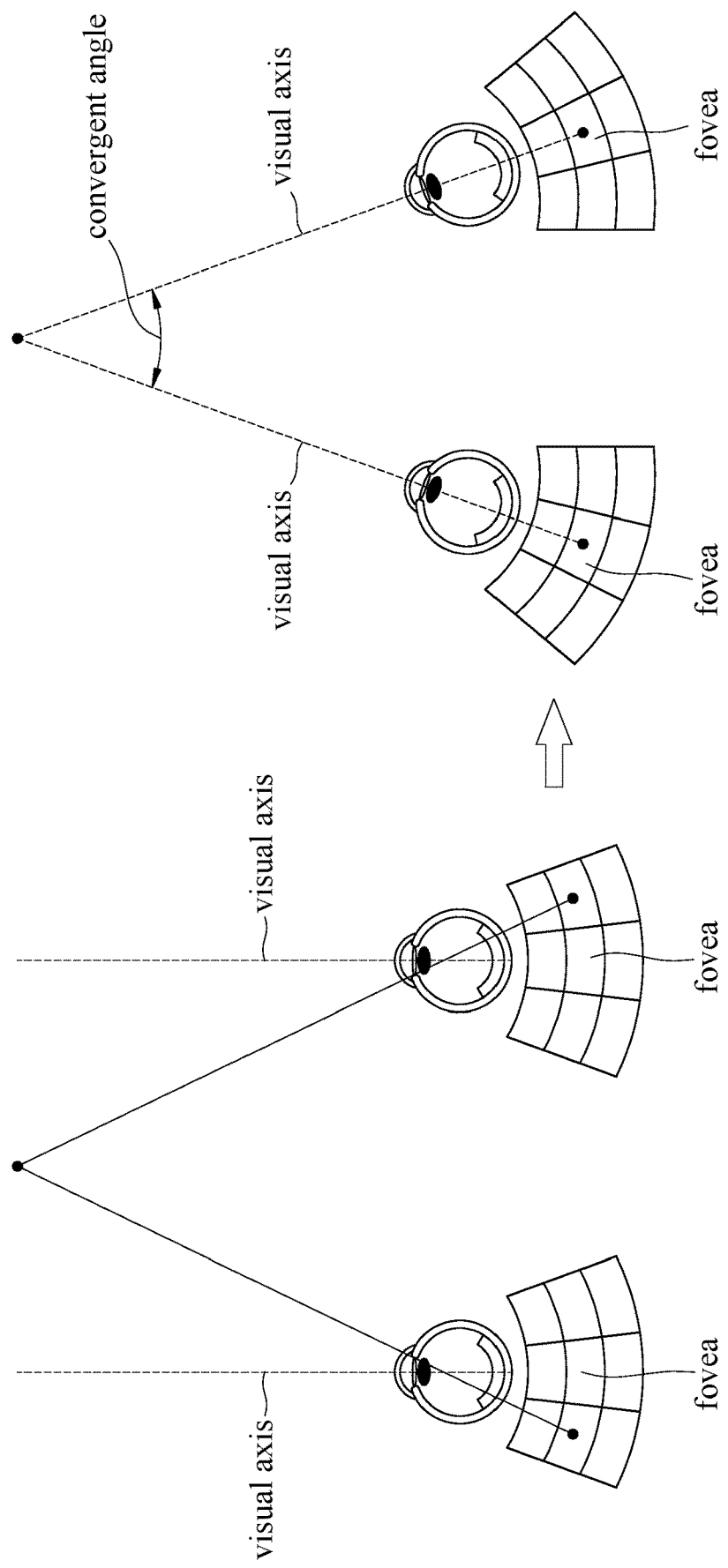
FIG. 2 illustrates the principle of binocular vision implemented in the present invention.

For the convenience of illustrating the principle of human vision and retina scanning, the retina of the first eye and the second eye of the viewer are represented as matrixes, each of the matrix elements corresponds to a specific horizontal and vertical location on the retina. Furthermore, only a few light instances are shown in the figures for simplicity. With reference to FIG. 2, according to natural vision, when human look at an object, the visual axis (which is defined as the virtual line from the center of the retina (or center of fovea) to the center of the pupil and extending onward) of the left eye and the right eye point in the direction of the object, causing the visual axes of the eyes to converge at the location of the object. Therefore, light coming from the object is received by the center retinae region (fovea) of the viewer where most of the visual cells are located. The lenses of the eyes then focus on the object based upon the distance between the object and the eyes. In other words, in order to have an accurate depth perception, the orientation of the visual axes of the eyes need to change (i.e., the eyes rotate toward the direction of the object) to allow the object image to land on an area close to the center of the retinae (fovea). Accurate depth perception is at least in part related to the convergent angle between the two visual axes of the eyes. That is to say, depth perception of the human binocular vision is based in part upon the convergent angle between the two visual axes of the eyes. When the convergent angle increases, depth perception perceived and interpreted by human vision decreases, meaning the object is moving closer to the viewer. On the other hand, when the convergent angle decreases, depth perception perceived and interpreted by human vision increases, meaning the object is moving farther away from the viewer. In the case which light from the object is received by area outside the center region of the retinae (which means when the visual axes of the eyes are not pointing at the object), depth perception is degraded. However, the viewer can still vaguely perceive the location and depth of the object. Therefore, when the viewer wants to view the object clearly, the eyes need to turn toward the object in a way such that the light coming from the object is landing close to the fovea, as shown in FIG. 2.

Figure 3A:
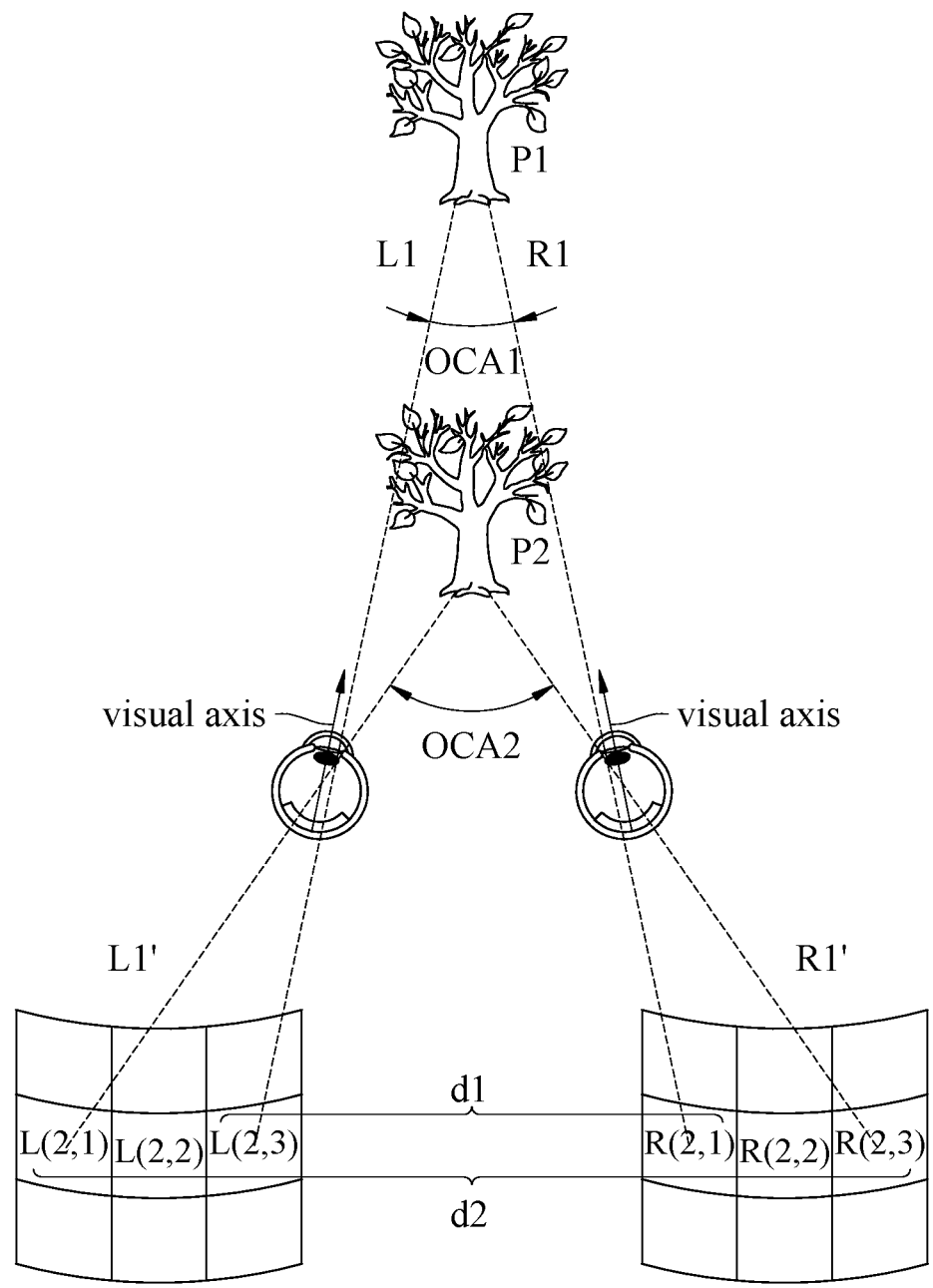
FIG. 3A illustrates the principle for rendering depth perception in accordance with the present invention.
Figure 3B:
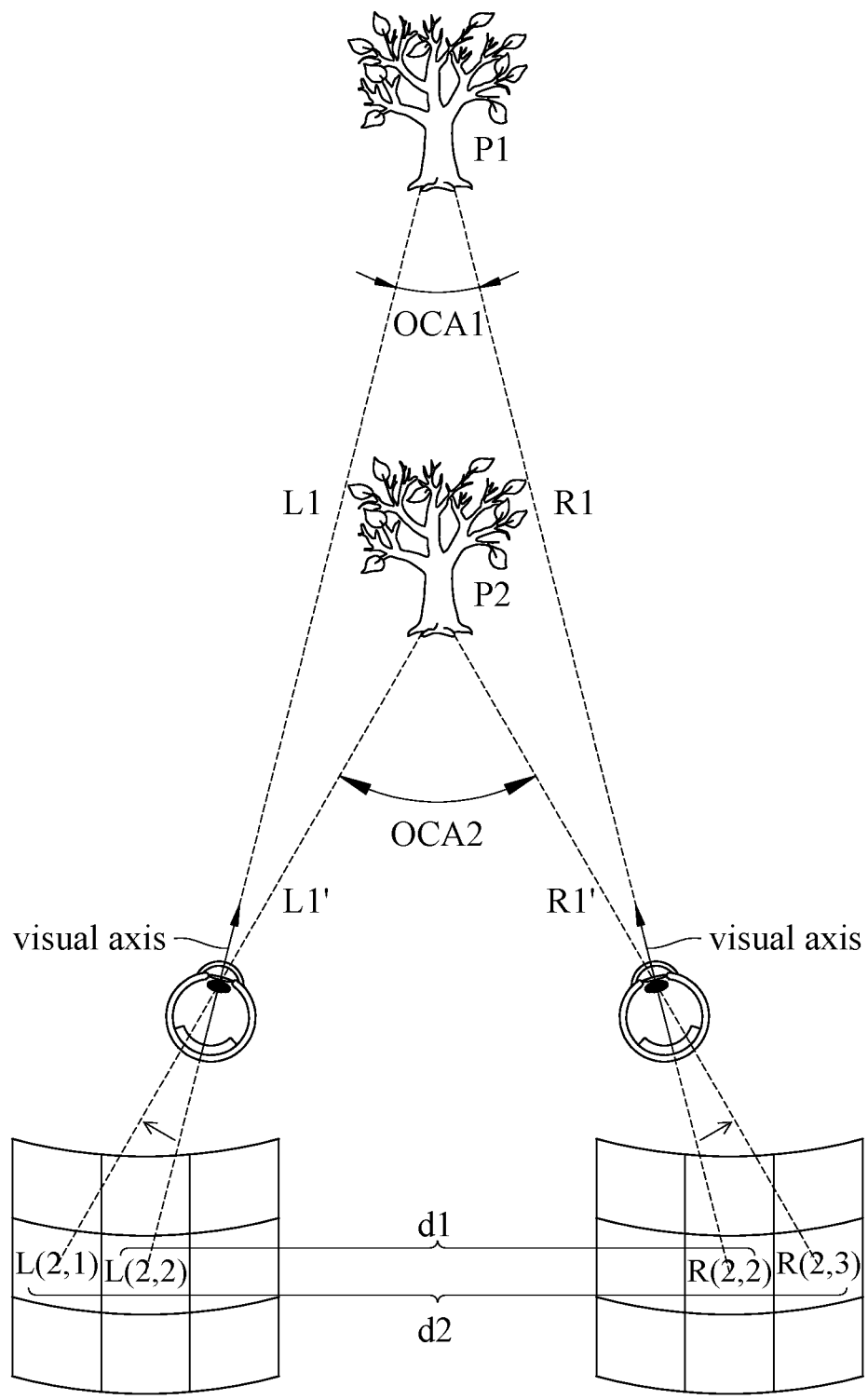
FIG. 3B illustrates the principle for rendering depth perception in accordance with the present invention.

With reference to FIG. 3A, the first and second retina of the viewer are illustrated as two matrixes, with L(2,2) and R(2,2) representing the center area of the retinae. Light instances R1 and L1 from the first object P1 arrive at R(2,1) and L(2,3) of the first and second retina (which is not at the center of the retinae). Light instances R1' and L1' from the second object P2 arrive at R(2,3) and L(2,1) of the first and second retina (which is also not at the center of the retinae). In addition to the convergent angle, the depth perceived by the viewer when the viewer fixates at the object is also correlated to the horizontal distance between the location where the two retinae receive the light instances. More particularly, the distance d1 between the locations (R(2,1) and L(2,3)) where the two eyes receive the light instances from the first object P1 is less than the distance d2 between the locations (R(2,3) and L(2,1)) where the two eyes receive the light instances from the second object P2. When fixating at first object P1 and second object P2, the eye will recognize and interpret that the first object P1 is further away relative to the second object P2. In other words, it can be seen that the depth of an object perceived by the eyes is influenced by the location on the retinae of the two eyes where the light instance is received. With reference to FIG. 3B, notice that when the viewer intends to fixate at the first object P1, the eyes turn in the direction of the object so the visual axes point at the object; as a result, the object image can land at the center of the retina (fovea). Thereby, accurate depth perception can be obtained. Furthermore, according to some embodiments, when the viewer fixates at the object, the visual axis of the first eye and the second eye aligns with the light path of the light instances; thereby, the convergent angle of the visual axes is the same as the optical convergent angle (OCA; which refers to the convergent angle between the extension of optical paths of the light instances R1 and L1, and R1' and L1'). As shown in FIG. 3B, the viewer fixates at P1; in this case, the eyes turn toward P1 so light instances R1 and L1 land on the center of the retina (L(2,2) and R(2,2)).

Notice that the distance d1 and d2 in FIG. 3A-3B change according to the change in optical convergent angle. Particularly, d1 corresponds to the distance between the receiving location of the right light instance and left light instance on the retinae when the optical convergent angle OCA1; and d2 corresponds to the distance between the receiving location of the right light instance and left light instance on the retinae when the optical convergent angle OCA2. That is to say, a relatively large optical convergent angle corresponds to a larger distance between the receiving locations of the right light instance and left light instance on the retinae. It is worth mentioning that in natural vision, although there may be infinite number of first light instance and second light instance from a point of the object due to light scattering; however, all of the first instances and the second instances are roughly converged to a single location respectively by the lens of the eyes, which is known as the accommodation of the eyes. Therefore, for the simplicity of explaining the present invention, only one two instances from the object are shown.

Figure 4:
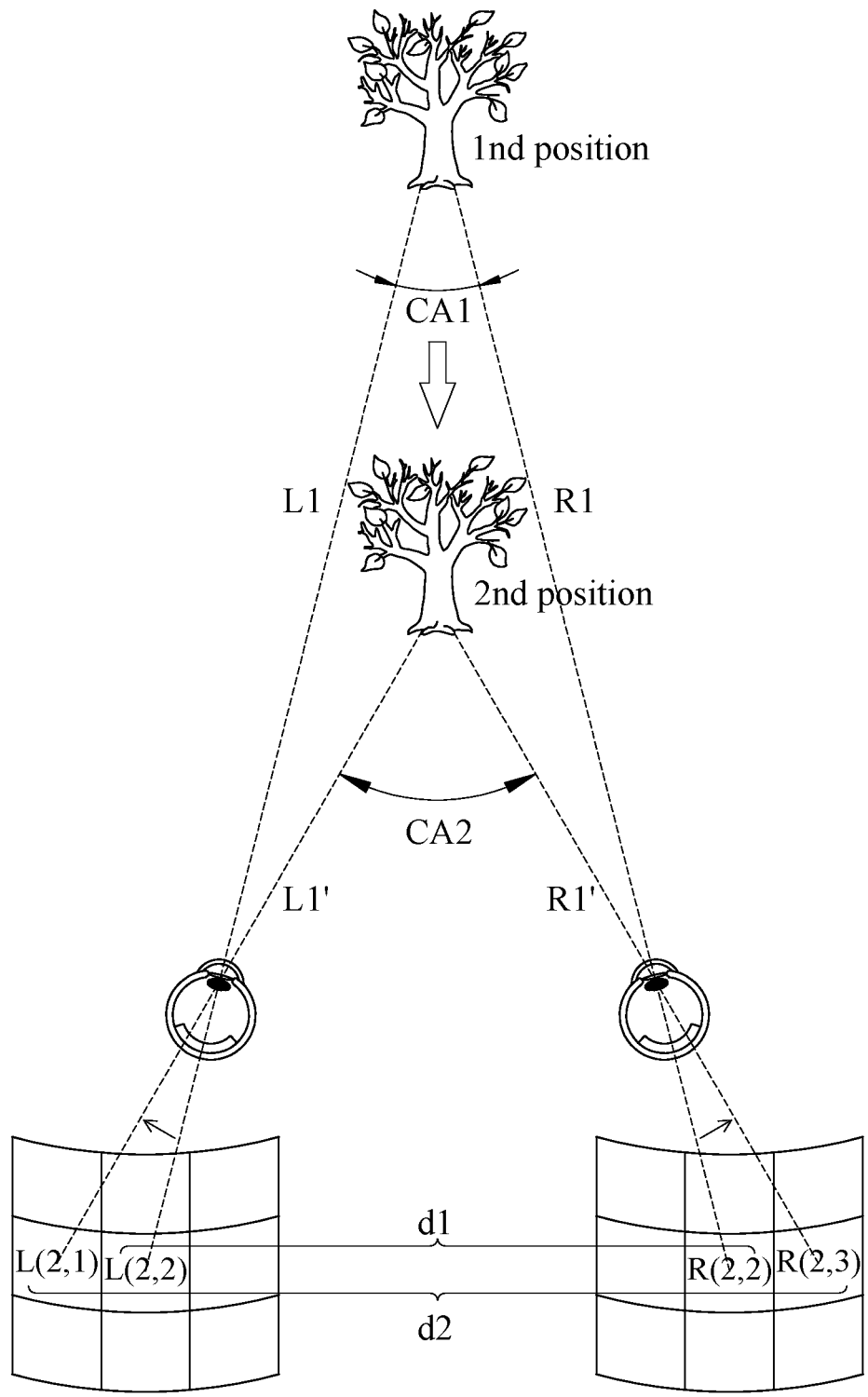
FIG. 4 illustrates the principle for rendering an object moving in the depth direction in accordance with the present invention.

With reference to FIG. 4, which illustrates a same object moving from 1st position to 2nd position; in this example, the eyes of the viewer are initially fixating at 1st position. The right light instance R1 from the object arrives at location R(2,2) of the first retina, which corresponds to the center of the first retina. The corresponding left light instance L1 from the object arrives at location L(2,2) of the second retina, which corresponds to the center of the second retina. When the near eye display system displays that the object moves from a position 1st position to 2nd position, the location where the right light instance R1 emitted to the first retina changes gradually from R(2,2) to R(2,3), and the location where the left light instance L1 emitted to the second retina changes gradually from L(2,2) to L(2,1). The distance between the location where the right light instance R1 being and the location where the left light instance L1 being received changes from d1 to d2 (which is increasing). Suppose the viewer fixates at the object at all time, the convergent point of the two visual axes of the viewer's eyes moves gradually from 1st position to 2nd position. And the convergent angle between the first visual axis and the second visual axis is increased gradually (from CA1 to CA2 because of CA2>CA1). At the moment when the object reaches 2nd position, the orientation of the eyes is changed such that the right light instance (now R1') and the left light instance (now L1') land on the center of the fovea (e.g., R(2,2) and L(2,2)) again. As a result, the viewer perceives the object moves from a farther location to a nearer location relative to the viewer. The convergent angle is processed by human brain to interpret the depth of the object. The larger the convergent angle, the closer the object is perceived by human brain; conversely, the smaller the convergent angle, the farther the object is perceived by human brain. Therefore, during the period of the object moving, the multiple depths of the object are perceived.

As aforementioned, it is already well known that for rendering a virtual image at a specific vertical and horizontal locations, light signals need to be emitted to the corresponding vertical and horizontal position on the retinae of the eyes. However, based upon the present invention, it can also be understood that in order to render a partial binocular image having a specific depth, light signals need to be provided to specific horizontal locations on the retina to maintain a corresponding distance between the locations where the light signals are received by the retinae. In other words, when a right light instance (or signal) and a left light instance (or signal) from a virtual image are received by the first retina and the second retina respectively at a specific location, the fusional image will be interpreted to be at a specific three-dimensional location in real space corresponding to said pair of specific locations. In other words, for every possible spatial coordinate of a partial binocular image created by the AR/MR near eye display system of the present invention, there is a corresponding pair of locations on the first and second retina to which the first and second instance of light from the AR/MR near eye display system need to be emitted so as to render said partial binocular image at the at desired spatial coordinate. These pairs of locations on the first and second retina are referred as pairs of designated location in the present invention because when stimulated with light, each pair of designated location can render a partial binocular image with unique three-dimensional coordinate; and for every possible three-dimensional coordinate, there is a unique pair of designated locations of two retinae to be simulated to render a pixel at said three-dimensional coordinate. Variation in the coordinates can be achieved by emitting light signals to different pairs designated locations. As long as the light signals are emitted to the specific pair designated locations on the retinae, the eyes of the human are able to perceive a partial binocular image at the corresponding locations in real space regardless the angle of the incident lights toward the retinae.

Figure 5:
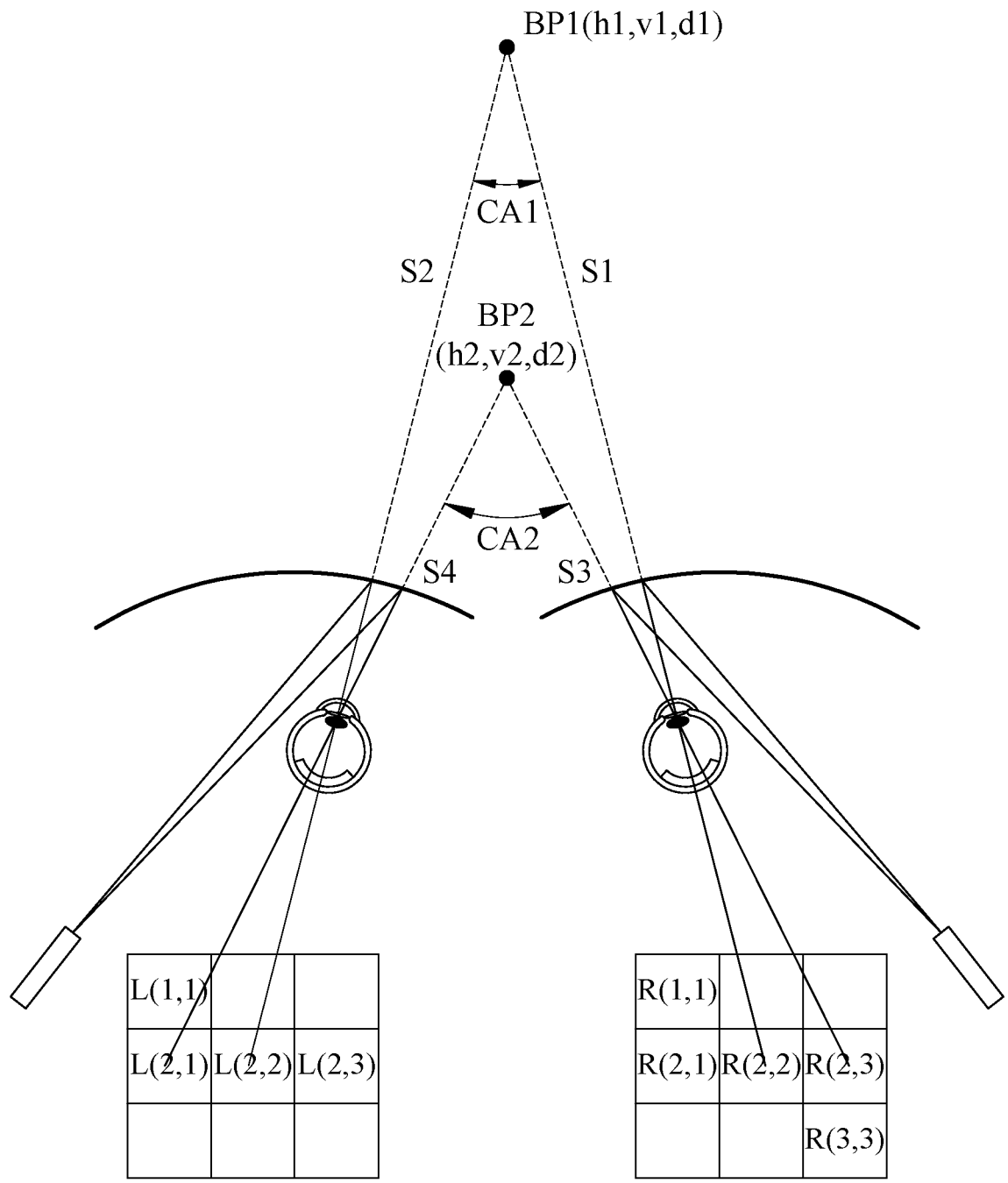
FIG. 5 illustrates the principle for rendering an object consists of a plurality of pixel having different depth in accordance with the present invention.

With reference to FIG. 5, it illustrates an exemplary method for rendering multiple pixels simultaneously with different depth perception in accordance with the present invention in AR/MR near eye display system based upon the principle mentioned above. A first partial binocular image BP1 formed by fusion of the right light signal S1 and the left light signal S2 having a first depth d1 (with three-dimensional coordinate of h1, v1, d1) and a second partial binocular image BP2 formed by fusion of the third light signal S3 and the fourth light signal S4 having a second depth d2 (with three-dimensional coordinate of h2, v2, d2) are shown in FIG. 5. The first partial binocular image BP1 is rendered by emitting light signals to a pair of designated locations R(2,2) and L(2,2) when the eyes have a particular orientation. The second partial binocular image BP2 is rendered by emitting light signals to a pair of designated locations R(2,3) and L(2,1). In this example, we assume the pair of designated locations R(2,2) and L(2,2) corresponds to the center of the fovea for the first eye and the second eye where the sensitivity for depth perception is the highest. The viewer is free to fixate at any location at any given time. Due to the nature of retina scanning, the images provided to the retinae of the viewer are always in focus. Therefore, the viewer can see a clear image without trying to focusing on the image with the lenses of the eyes. As an example, when the eyesight of the viewer moves from BP1 to BP2, the eyes change the orientation of the visual axes such that the third light signal S3 and the fourth light signal S4 are relocated from R(2,3) and L(2,1) to R(2,2) and L(2,2), a larger convergent angle CA2 of the two visual axes (relative to CA1) is formed. Thereby, the second partial binocular image BP2 is perceived by the viewer to have a smaller depth (i.e., closer to the viewer) than the first partial binocular image BP1. By the same token, for forming an image containing a plurality of partial binocular images (e.g., pixels), the partial binocular images can be rendered by emitting a plurality of light signals to the first and second retina to various pairs of designated locations, thereby, forming an entire image of a virtual object.

Figure 6:
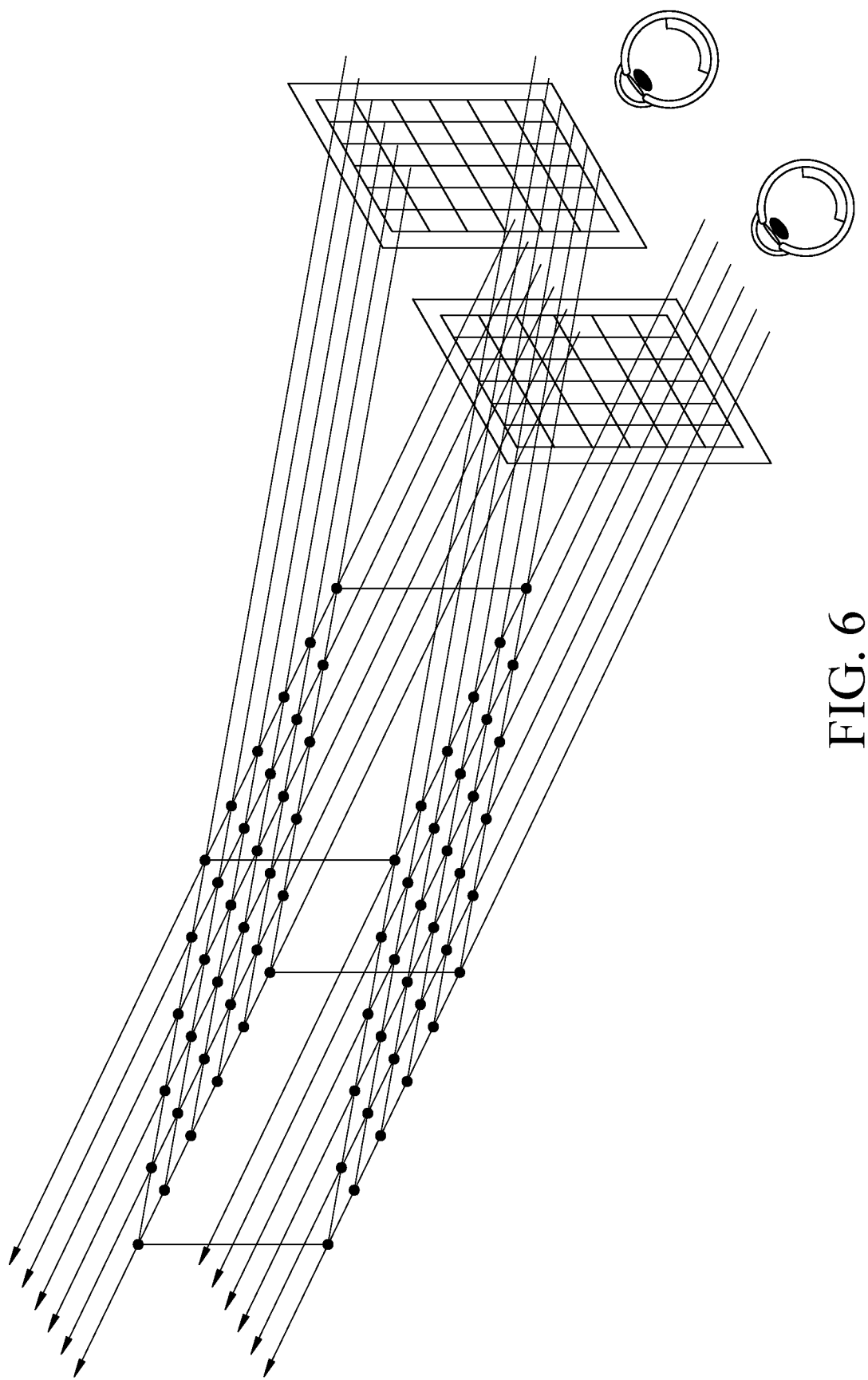
FIG. 6 illustrates the relationship between the partial binocular images located in 3D space and the pairs of designated locations of retinae which forms the partial binocular images.

FIG. 6 further illustrates the relationship between the partial binocular images located in 3D space and the pairs of designated locations of retinae which forms the partial binocular images. In this example, the first and second retina are respectively divided into 36 (6×6) designated locations. It is known that in order for fusion of vision to happen, the image emitted to the right eye and the corresponding image emitted to the left eye need to have similar vertical position (relative to the eyes of the human). Therefore, the pair of designated locations need to have substantially the same vertical position (relative to the eyes of the human).

With reference to FIG. 7, for demonstrative purpose, pairs of designated locations and the corresponding three-dimensional coordinate(horizontal, vertical, and depth) rendered when light signals are received by each of the pairs of designated locations are shown as table in FIG. 7. For example, 216 partial binocular images, numbering from 1 to 216, are formed by emitting light signals to 36 (6×6) designated location on the first retina and 36 (6×6) designated location on the second retina. The first (1st) partial binocular image BP(1) having horizontal coordinate h1, vertical coordinate v1, and depth coordinate d1 is rendered by the pair of designated locations R(1,1) and L(1,1); the second (2nd) partial binocular image BP(2) having horizontal coordinate h2, vertical coordinate v2, and depth coordinate d2 is rendered by the pair of designated locations R(1,1) and left pixel L(1,2). Thus, in order to display a partial binocular image at a specific 3-dimensional coordinate in real space, the light signals emitted into the left eye and the right eye of the viewer need to be received at the corresponding designated locations on the surface of the retinae of the viewer based on the information shown below.

Figure 8:
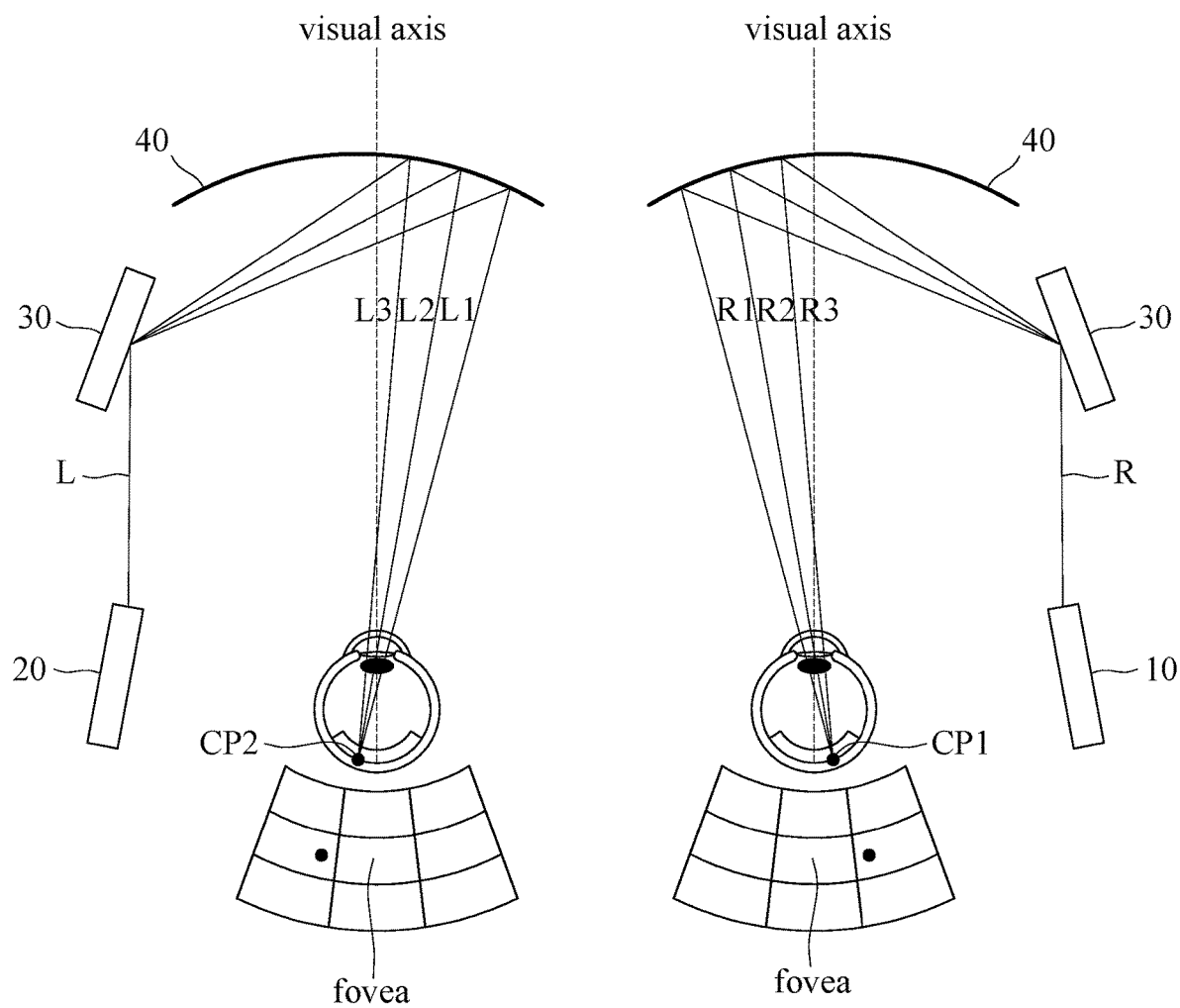
FIG. 8 illustrates one embodiment in accordance with the present invention.

The following describes method for increasing the eyebox in retina scanning-based AR/MR near eye display system. In the retina scanning-based AR/MR near eye display system, an image frame or a binocular image containing a plurality of pixels is emitted to the retinae of the eyes of the viewer. In the present invention, each light signal (or pixel) emitted by the light emitter is divided into multiple instances. The division of the light signal can be achieved with conventional optical duplicators, such as beam splitters, polarizing splitter, half-silvered mirrors, partial reflective mirror, dichroic mirrored prisms, dichroic or dielectric optical coatings. The optical duplicator may comprise multiple optical components to duplicate the incident light signal into a plurality of instances. Each of the optical component may be one lens, reflector, partial reflector, prism, minor, or a combination of the aforementioned. With reference to FIG. 8, the multi-instances emission system for retina scanning based near eye display in accordance with the present invention may comprise a right light emitter 10 and a left light emitter 20 for respectively emitting a right light signal R and a left light signal L. At least one optical duplicator is utilized for respectively dividing the right light signal R and the left light signal L into multiple light instances (e.g., R1, R2, R3, L1, L2, and L3). Furthermore, at least one light signal redirector 40 is provided for changing direction of a plurality of light instances of the right light signal R and a plurality of light instances of the left light signal L, such that the plurality of light instances of the right light signal have optical paths that converge with each other to form a first converging point CP1; meanwhile, the plurality of light instances of the left light signal have optical paths that converge with each other to form a second converging point CP2. As an example, the light signal redirector 40 may be a partial reflector or a reflective minor. FIG. 8 illustrates three light instances for both the right light signal R and left light signal L; however, the number of light instances is not limited to three. The light signal redirector 40 receives and redirects light instances towards the retinae of the viewer. In an application of augmented reality (AR) or mixed reality (MR), the light signal redirector 40 can be transparent for ambient lights. In some embodiments of the present invention, the first converging point CP1 and the second converging point CP2 are located sustainably on retina of the first eye and the second eye, as shown in FIG. 8. In some alternative embodiments of the present invention, it is also possible that the first converging point CP1 and the second converging point CP2 are located sustainably on a side of the retina of the first eye and the second eye. Nonetheless, the first converging point CP1 and the second converging point CP2 are located at the optical path after entering the pupil of the first eye and the second eye. With reference to FIG. 8, in some embodiments of the present invention, the optical paths of the light instances of the right light signal R (or the left light signal L) only converge at one location after being redirected by the light signal redirector 40. In the case which multiple light signal redirectors 40 are implemented, the optical paths of the light instances of the right light signal R (or the left light signal L) only converge at one location after being redirected by the last light signal redirector 40 (located closest to the eye on the optical path of the light instances); and the converging points occur on the optical path after the light instances entering the pupil. Notice that each of the plurality of light instances (R1, R2, and R3) of the right light signal R comprises a same image information; and each of the plurality of light instances (L1, L2, and L3) of the left light signal L comprises a same image information. Each of the plurality of light instances (R1, R2, and R3) of the right light signal R provides the first eye with the image information of the right light signal R at various orientation of the first eye. That is to say, unlike the conventional retina scanning system, the first eye of the viewer is still able to receive the image information of the light signal even if the pupil of the eye is pointing at different directions. Furthermore, since the plurality of light instances (R1, R2, and R3) of the right light signal R (or the plurality of light instances (L1, L2, and L3) of the left light signal L) converge to a single point on the retina. Therefore, the viewer only sees a unify image of the right light signal R (or left light signal L) regardless the orientation of the eyes; as oppose to the prior arts which multiple images may be seen by the viewer (caused by overlapping between different view-points).

Figure 9:
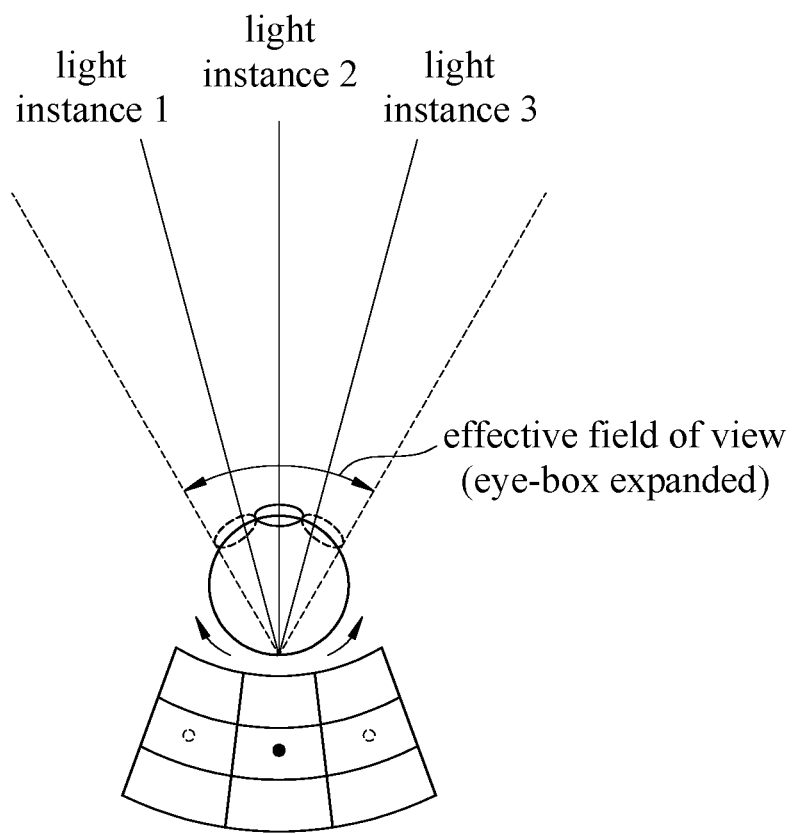
FIG. 9 illustrates the principle of eyebox expansion in accordance with the present invention.

As shown in FIG. 9, suppose light instances 1, 2, and 3 are originally emitted to the center area of the retina while the eye is looking straight ahead. When the eye of the viewer turns, the converging point of the light instances of the light signal is landing on different locations relative to the retina; as a result, the viewer perceives that the light signal moves in the field of view as he/she rotates the eye. Furthermore, since there are multiple light instances of the light signal, the eye of the viewer is able to receive image information from different orientation of the eyes. Thereby, the eyebox and the effective field of view are increased. Conventionally, when only one light instance is utilized for each light signal (or each pixel), if the pupil rotates exceedingly away from the light instance, the light instance of the light signal can no longer enters the pupil; the image of said light signal disappears from the field of view of the viewer.

When a plurality of light instances having different incident angles relative to the retina are utilized, the eyes is able to receive the information of the light signal at various orientation. As a result, the eyebox of the present invention is significantly increased relative to the prior art.

Figure 10:
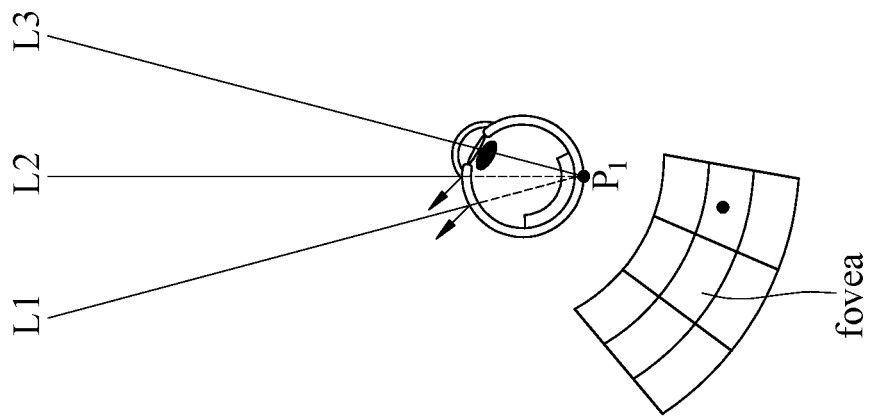
FIG. 10 illustrates the principle of eyebox expansion in accordance with the present invention.
Figure 10:
Figure 10:
Figure 10:
Figure 10:
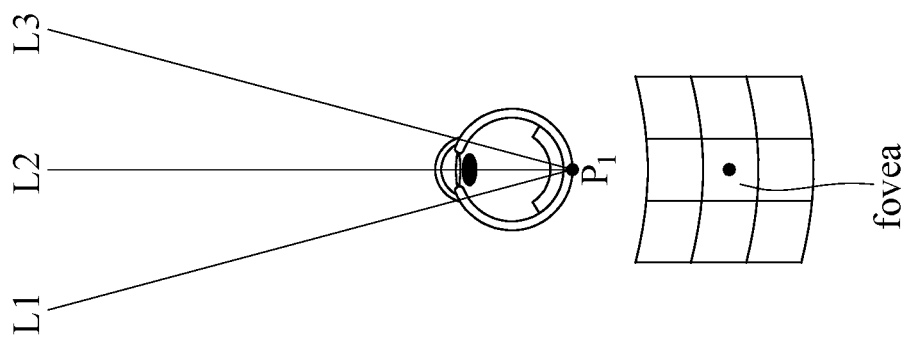

Furthermore, since the eye of the viewer can see the light signal from different orientation of the eye, the image of said light signal is may always be present during the rotation of the eye, and the viewer can see the image of the signal move smoothly to the side of the field of view when rotating the eye. With reference to FIG. 10, in one embodiment of the present invention, when the eye looks straight ahead, the eye may be able to receive light instance L1, L2, and L3. When the eye rotates to the left, although light instance L2 and L3 are not able to enter the eye; however, the retina of the eye may still be able to receive light instance L1. The location where the retina receives the light instance changes from the fovea to the left side of the retina. When the eye rotates to the right, although light instance L1 and L2 are not able to enter the eye; however, the fovea of the eye may still be able to receive light instance L3. The location where the retina receives the light instance changes from the fovea to the right side of the retina. Therefore, regardless the orientation of the eye, the viewer can see the image of a partial binocular image.

In the present invention, each pixel of an image frame may be rendered by emitting multiple light instances from different incident angles to the same designated location on the retina. As previously discussed, each pair of designated locations on the retinae represents a specific three-dimensional position with a single coordinate in x,y,z. The depth position (as well as the horizontal and vertical positions) of a partial binocular image perceived by the viewer is independent of the incident angle of the light instances forming said partial binocular image, as long as the multiple light instances with the same information are received by the same location of the retina. The depth position perceived by the viewer when the viewer fixate at the pixel is related to the distance between converging point of the light instances of the right light signal and the converging point of the light instances of the left light signal. This means, no matter how many light instances are received by a pair of designated locations (e.g., R(2,2) and L(2,2), and R(3,2) and L(1,2)) of the retinae, only one image of pixel at a particular spatial location in three-dimensional space can be perceived. Therefore, in one embodiment of the present embodiment, all the multiple light instances for rendering need to have the same pixel contain the same image information; and each pair of designated locations may receive multiple light instances from different angles.

The following describes another embodiment of the method for rendering depth perception of the partial binocular image in accordance with the present invention. As mentioned earlier, the depth perception of a partial binocular image formed by the right light signal and the left light signal when the viewer fixate at the partial binocular image is correlated to the convergent angle between the visual axes of the eyes. From the perspective of the head wearable display system, the convergent angle of the viewer's eyes (previously defined as the angle between the visual axes of the eyes when fixating at an object), which correlates to the angle that the two visual axes of the eyes need to turn toward each other for the light signals to land on the fovea, can be manipulated to through changing the distance between the first converging point and the second converging point of the light instances of the light signals. The depth perception of the partial binocular image can be manipulated by changing the relative horizontal location where the first converging point and the second converging point are projected to (in turn, changing the distance between the first converging point and the second converging point). However, in reality, since the geometry and parameters of the eyes of the viewer vary from person to person; therefore, several additional factors need to be taken into consideration: the interpupillary distance (IPD) of the viewer, and the orientation of the eyes of the viewer when fixating at a particular depth. For example, the locations of the first converging point and the second converging point on the retinae need to adapt to the IPD of the viewer. Therefore, the variation of the depth with respect to time of the partial binocular image when the viewer perceives the right light signal and the left light signal is achieved by modulating the distance between the first converging point and the second converging point based on the IPD of the viewer; thereby, the location of the converging point can be projected to the correct location on the retina for the respective viewer. Furthermore, since retina is curved instead of flat, in some embodiments, the location of the first converging point and the second converging point on the retinae also need to be adapted and modified according to the rotation of the eyes orientation to render accurate depth perception (as well as the vertical and horizontal perception) of the binocular image. Notice that the depth perception mentioned in the present invention refers to the depth felt by the viewer when the viewer turns the eyes to fixate at the spatial location where the partial binocular image (virtual image) or the binocular image (also virtual image) is located. This is characterized by viewer turning the fovea of the eyes such that the converging points of the light instances land on the fovea (or substantially in proximity to the fovea). At this moment, the visual axes of the eyes point toward the rendered location of the binocular image or partial binocular image. More specifically, the rendered location (the location appear to the viewer) of the binocular image or partial binocular image is where the visual axes of the eyes intersect. When the viewer looks away from the partial binocular image or the binocular image, the depth perception degraded. However, this is consistence with natural vision. When a binocular image consisted of a plurality of partial binocular images is rendered, each pair of first converging point and second converging point of each of the partial binocular images has different distance between the first converging point and second converging point; furthermore, each pair of first converging point and second converging point is received by different location of the retinae of the viewer. The depth perceived by the viewer of each portion (which corresponds to a partial binocular image) of the binocular image depends upon the amount of angle which the eyes need to turn (which corresponds to the convergent angle, which varies among different viewers with different IPD) for individual viewer for his/her fovea to receive the first and second converging point. Therefore, in order to accurately render depth perception of a partial binocular image or a binocular image, an initial calibration process may be carried out to determine the relationship between converging points and the corresponding orientation of the eyes for an individual viewer. For example, the IPD of the viewer need to be determined first to know the distance between the fovea between the two eyes. The viewer may be then presented with partial binocular images having various distance between the first and second converging points (meaning these partial binocular images have different perceivable depth for the viewer). The viewer may be asked to fixate at the partial binocular images having different perceivable depth one at a time; and corresponding orientations of the eyes (when the viewer fixate at a particular partial binocular image having a specific depth) are then determined by using eye tracking devices. As a result, the relationship between the distance between the first and second converging points and the corresponding convergent angle (which is related to the depth perceived by the viewer) of the eyes can be determined. This relationship can be used for rendering accurate depth perception for individual users. In some other embodiments, the calibration may be omitted when a default preset of parameters are used for determined the relations between depth perception and the distance between the converging points and the orientation of the eyes. Also, there are other ways to calibrate the relations between depth perception and the distance between the converging points and the orientation of the eyes which do not deviate from the spirit of the present invention.

Figure 11A:
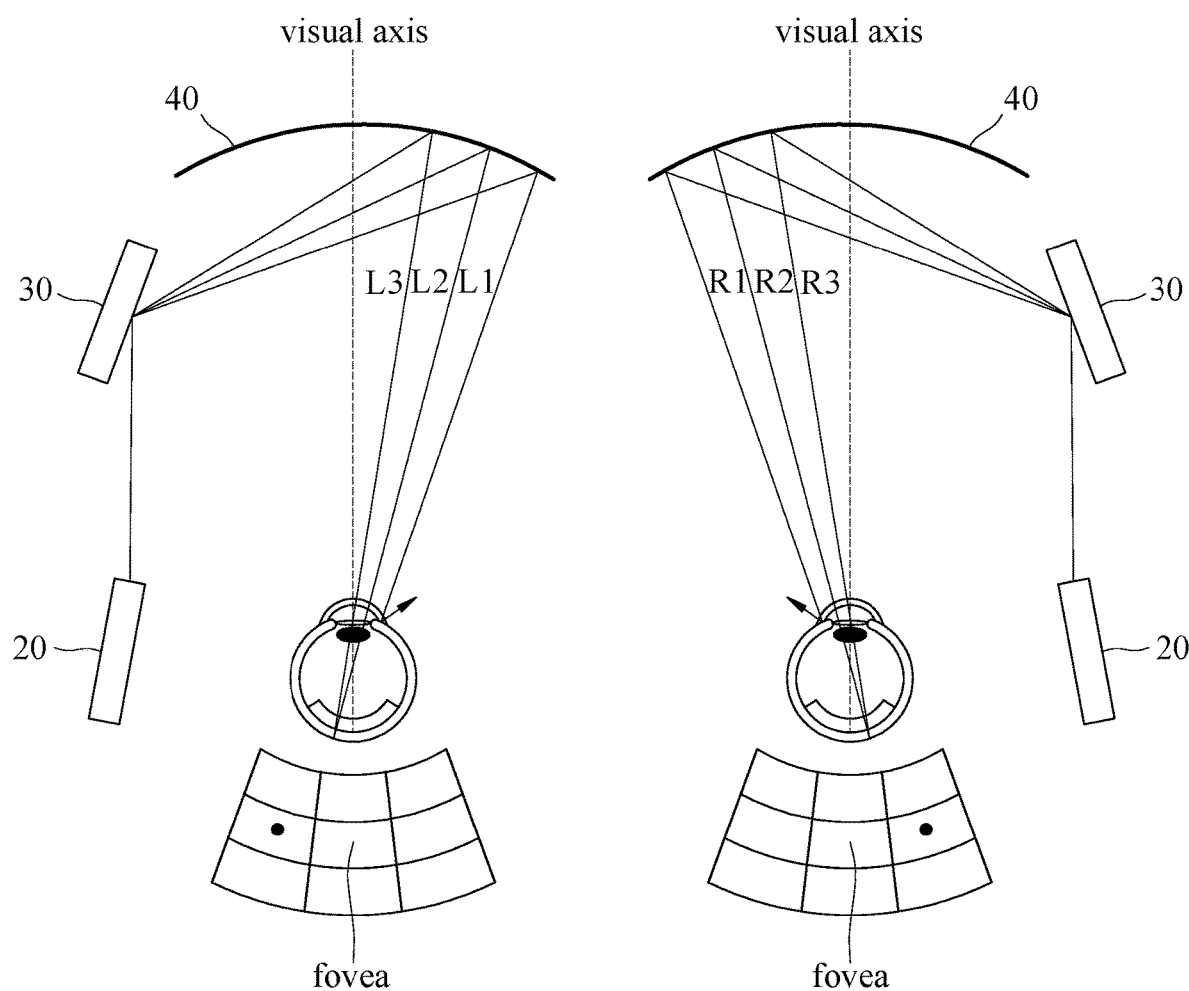
FIG. 11A illustrates another embodiment in accordance with the present invention.
Figure 11B:
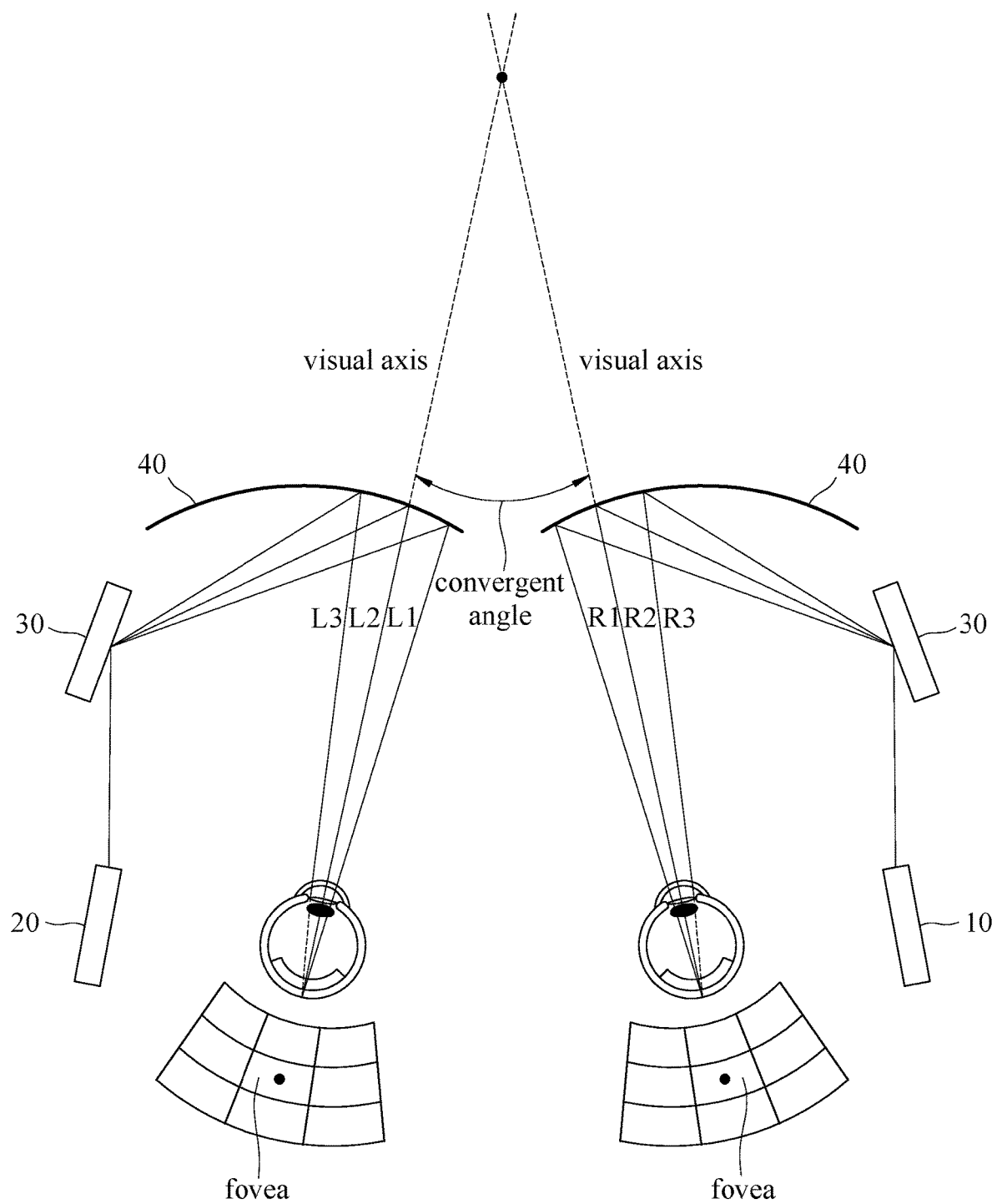
FIG. 11B illustrates another embodiment in accordance with the present invention.

The following describes an exemplary embodiment for rendering image having three-dimensional perception (vertical, horizontal, and depth perception) with expanded effective field of view in accordance with the present invention. With reference to FIGS. 11A and 11B, in this example, a partial binocular image (e.g., a pixel of a binocular image frame) of a virtual object is shown. The partial binocular image is rendered via the fusion a left pixel (which is emitted by the left light emitter 20) received by the left retina and a right pixel (which is emitted by the right light emitter 10) received by the right retina. Furthermore, the left pixel is divided into a plurality of left light instances (L1, L2, and L3) by the optical duplicator 30; similarly, the right pixel is divided into a plurality of right light instances (R1, R2, and R3) by the optical duplicator 30. The plurality of left light instances and the plurality of right light instances are respectively redirected by the light signal redirector 40 to the left retina and right retina of the viewer. More specifically, each of the first, second, and third left light instances (L1, L2, and L3) are directed to the same designated location of the left retina, forming a left converging point LCP; each of the first, second, and third right light instances (R1, R2, and R3) are directed to the same designated location on the right retina, forming a right converging point RCP. In FIG. 11A, the eyes of the viewer are initially looking straight ahead (the visual axes are pointing directly to the front); which implies the eyes are not fixating at the partial binocular image, and the left and right pixel are not received by the center of the retinae. However, the viewer can perceive a vague image of the partial binocular image. With reference to FIG. 11B, the eyes of the viewer now turn toward (or fixate at) the partial binocular image; the light instances of the left pixel and the right pixel are now received by the center region of the retinae respectively. Notice that the visual axis of the eye is the imaginary line extending from the fovea to the center of the pupil. The location of the partial binocular image appears to be at the location where the visual axes intersect for the viewer. As mentioned earlier the depth perception is based upon the convergent angle of the visual axes of the two eyes. Furthermore, according to the present embodiment, for an image having a plurality of partial binocular images, since each of the right pixels and left pixels of the partial binocular images are composed of multiple light instances having different incident angles, the retina can receive the light instances regardless the orientation of the eye (i.e., the eye of the viewer may rotate when fixating at different locations); therefore, the viewer will be able to see the partial binocular image to move within the field of view. Furthermore, the viewer can see the partial binocular images with wider eye-box, which means the effective field of view is expanded. In the case of FIG. 11B, although the third light instance L3 and the third right light instance R3 is no longer able to enter the pupils, all the remaining light instances can still be received by the eyes. Thereby, the effective view angle of the partial binocular image is expanded. In the present invention, the location where the eyes fixate at the virtual image and the focus accommodation of the location match each other in the three-dimensional space. Therefore, focal rivalry can be eliminated according to the present invention.

The foregoing uses partial binocular image (e.g., a pixel of an entire image frame) to describe the embodiment of the present invention. However, it is apparent that a full image with a plurality of pixels, or a virtual object consisted of a plurality of pixels may be rendered in similar fashion. In this embodiment, the right light emitter 10 and the left light emitter 20 respectively emit a plurality of right light signals and a plurality of left light signals to the first eye and the second eye of the viewer. Each pixel of the image frame is formed by the fusion of the corresponding right light signal and left light signal. Each of the plurality of right light signals may have a corresponding left light signal from the plurality of left light signals; each of the plurality of right light signals and the corresponding left light signal from the plurality of left light signals comprise similar image information of a respective partial binocular image. Each of the plurality of right light signals and the plurality of left light signals are divided into multiple light instances having different first converging points and the second converging points. This implies that for every pair of the right light signal and the corresponding left light signal, there is a respective distance between the first converging point and second converging point of the light instances. That is to say, for a binocular image (e.g., a virtual object) composed of multiple partial binocular images, each portion of the binocular image may have different depth perception relative to the viewer, and the distance between of the plurality of light instances of each of the plurality of right light signals and the corresponding left light signal varies relative to each other.

Based upon the above method, the present invention can create partial binocular image at any given spatial locations with depths. The visual axes of the viewer are able to point directly at the location where the virtual image is rendered; thereby, the eyes can fixate and focus at said location. As a result, any depth perception can be created without the use of display screen, which eliminate focal rivalry and vergence-accommodation conflict.

In natural vision, when the eyes rotate from one orientation to another, the object perceived by the viewer changes location in the field of view according to the rotation of the eyes. For example, when the eyes rolls toward the left side of the viewer, the object appears to be moving to the right with respect to the field of view; but the object remains at the same three-dimensional coordinate in real space relative to the environment. Similarly, in augmented reality or mixed reality environment, a virtual object produced by the near eye display may be configured to be fixed relative to the real three-dimensional space. When the eyes of the viewer rotate, or when the orientation of the viewer changes, the virtual object may appear to be moving with respect to the field of view of the viewer. In this example, an image of said virtual object is emitted to the left and right retina of the viewer at fixed location relative to the real three-dimensional space. When the eyes of the viewer rotate and the visual axes of the left and right eye change their orientation, the pixels composing the virtual image shift to a new location on the retina in because of the rotation of the eyes. As a result, the virtual object appears to be moving to a different location in the field of view of the viewer.

In retina scanning-based AR/MR near eye display system, the pupil needs to align with the laser beam (or light instances) to allow light instances entering the eyes. Conventionally, only one instance per pixel is implemented; however, in the present invention, multiple light instances with different incident angles per pixel is implemented, the viewable area of the image produced by the near eye display system can be expanded, depending upon the number of instances and the incident angle of the light instances. As a result, the viewer may be able to find the emitted image easily when initially putting on the near eye display. Furthermore, with the implementation of multiple light instances per pixel (i.e., each of the light instances comprise the same image information), the pupil is able to receive light instances of the same pixel from various orientations (the orientation of the eye can be measured by the visual axes of the eye); whereas, in the case which only one instance is implemented per pixel, once the pupil rotates away from the light instance, the corresponding pixel can no longer enter the pupil. As a result, the image represented by said pixel can no longer be seen. Therefore, relative to the conventional art, the present invention can produce image with larger effective view angle.

In many of the embodiments mentioned above, the location of the first converging point and the second converging point remains unchanged regardless the orientation of the first eye and the second eye. When the viewer rotates the eyes, the relative motion between the location of the converging points and the retinae causes the converging points to be receive by different portion of the retinae; as a result, the viewer perceives that the virtual image moves with respect to the field of view. However, there may be other physiological factors effecting the location of the converging points to deviate from the desired location; for example, the geometry of the eyes of the individual viewer. Therefore, in some embodiments, the location of the first converging point and the second converging point need to be adjusted according to the orientation of the first eye and the second eye so the first converging point and the second converging point are located at the desired location on the retina.

The foregoing description of embodiments is provided to enable any person skilled in the art to make and use the subject matter. The method described herein can be performed in any orders. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded the widest scope consistent with the principles and novel features disclosed herein. It is contemplated that additional embodiments are within the spirit and true scope of the disclosed subject matter. Thus, it is intended that the present invention covers modifications and variations that come within the scope of the appended claims and their equivalents.

What is claimed is:

1. A multi-instances emission system for retina scanning based near eye display, comprising:
    a right light emitter and a left light emitter for respectively emitting a right light signal and a left light signal to a first eye and a second eye of a viewer, the right light signal and the left light signal respectively representing a right pixel and a left pixel of a partial binocular image;
    at least one optical duplicator for dividing the right light signal into a plurality of light instances of the right light signal and dividing the left light signal into a plurality of light instances of the left light signal, wherein all of the plurality of light instances of the right light signal represent the right pixel, and all of the plurality of light instances of the left light signal represent the left pixel; and at least one light signal redirector for changing directions of the plurality of light instances of the right light signal and the plurality of light instances of the left light signal, such that the plurality of light instances of the right light signal have optical paths that converge to form a first converging point, and the plurality of light instances of the left light signal have optical paths that converge to form a second converging point;

wherein the first converging point and the second converging point are respectively located on the optical paths of the plurality of light instances after leaving the at least one light signal redirector and entering respective pupils of the first eye and the second eye.

2. The system of claim 1, wherein a depth of a partial binocular image formed by the right light signal and the left light signal when the viewer fixate at the right light signal and the left light signal is related to a distance between the first converging point and the second converging point and an interpupillary distance of the viewer.

3. The system of claim 1, wherein the first converging point and the second converging point are located on respective retinas of the first eye and the second eye.

4. The system of claim 1, wherein the right light emitter and the left light emitter respectively emits a plurality of right light signals and a plurality of left light signals to the first eye and the second eye of the viewer, each of the plurality of right light signals has a corresponding left light signal from the plurality of left light signals, each of the plurality of right light signals and the corresponding left light signal from the plurality of left light signals comprise similar image information of a respective partial binocular image, each of the plurality of right light signals and the plurality of left light signals are divided into multiple light instances having different first converging points and the second converging points.

5. The system of claim 4, wherein a distance between the first converging point and second converging point of the plurality of light instances of each of the plurality of right light signals and the corresponding left light signal varies relative to each other.

6. The system of claim 1, wherein a depth coordinate of the partial binocular image is determined based on a distance between the first converging point and the second converging point and an orientation of the first eye and the second eye when the viewer perceives the partial binocular image.

7. The system of claim 6, wherein the orientation of the first eye and the second eye includes a convergent angle between visual axes of the first eye and the second eye.

8. A multi-instances emission method for retina scanning based near eye display, comprising:

emitting a right light signal and a left light signal to a first eye and a second eye of a viewer, the right light signal and the left light signal respectively representing a right pixel and a left pixel of a partial binocular image;

dividing the right light signal into a plurality of light instances of the right light signal and dividing the left light signal into a plurality of light instances of the left light signal, wherein all of the plurality of light instances of the right light signal represent the right pixel, and all of the plurality of light instances of the left light signal represent the left pixel;

by at least one light signal redirector, modulating directions of the plurality of light instances of the right light signal and the plurality of light instances of the left light signal, such that the plurality of light instances of the right light signal have optical paths that converge to form a first converging point, and the plurality of light instances of the left light signal have optical paths that converge to form a second converging point;

wherein the first converging point and the second converging point are respectively located on the optical paths of the plurality of light instances after leaving the at least one light signal redirector and entering respective pupils of the first eye and the second eye.

9. The method of claim 8, wherein a depth of a partial binocular image formed by the right light signal and the left light signal when the viewer perceives the right light signal and the left light signal correlates to a distance between the first converging point and the second converging point and an interpupillary distance of the viewer.

10. The method of claim 8, wherein the first converging point and the second converging point are located on respective retinas of the first eye and the second eye.

11. The method of claim 8, wherein locations on the respective retinas of the first converging point and the second converging point change according to an orientation of the first eye and the second eye.

12. The method of claim 8, wherein locations of the first converging point and the second converging point relative to the at least one light signal redirector remain constant regardless an orientation of the first eye and the second eye.

13. The method of claim 8, further comprising emitting a plurality of right light signals and a plurality of left light signals to the first eye and the second eye of the viewer, wherein a distance between the first converging point and second converging point of the plurality of light instances of each of the plurality of right light signals and the corresponding left light signal varies relative to each other.

14. The method of claim 8, wherein a variation of the depth with respect to time of the partial binocular image formed by the right light signal and the left light signal when the viewer perceives the right light signal and the left light signal is modulated by changing the distance between the first converging point and the second converging point based on an interpupillary distance of the viewer.

15. The method of claim 8, wherein a depth of the partial binocular image is determined based on the distance between the first converging point and the second converging point and an orientation of the first eye and the second eye when the viewer perceives the partial binocular image.

16. The method of claim 15, wherein the orientation of the first eye and the second eye includes the convergent angle between visual axes of the first eye and the second eye.

* * * * *